US010656285B2

(12) United States Patent
Berkovich et al.

(10) Patent No.: US 10,656,285 B2
(45) Date of Patent: May 19, 2020

(54) METHOD FOR POSITIONING A MOBILE TERMINAL AT THE MOMENT WHEN A TRIGGER EVENT OCCURS

(71) Applicant: INVENSENSE INTERNATIONAL, INC., Grand Cayman (KY)

(72) Inventors: Gennadii Mihajlovich Berkovich, Calgary (CA); Leonid Viktorovich Purto, Moscow (RU); Vladimir Aleksandrovich Sviridenko, Moscow (RU)

(73) Assignee: Trusted Positioning, Inc., Calgary (CA)

( * ) Notice: Subject to any disclaimer, the term of this patent is extended or adjusted under 35 U.S.C. 154(b) by 233 days.

(21) Appl. No.: 15/534,213

(22) PCT Filed: Dec. 8, 2014

(86) PCT No.: PCT/RU2014/000918
§ 371 (c)(1),
(2) Date: Jun. 8, 2017

(87) PCT Pub. No.: WO2016/093725
PCT Pub. Date: Jun. 16, 2016

(65) Prior Publication Data
US 2017/0336516 A1 Nov. 23, 2017

(51) Int. Cl.
*G01S 19/47* (2010.01)
*H04W 4/40* (2018.01)
*G01S 5/02* (2010.01)
*G01S 19/45* (2010.01)
*G01S 19/48* (2010.01)
(Continued)

(52) U.S. Cl.
CPC ............ *G01S 19/47* (2013.01); *G01S 5/0263* (2013.01); *G01S 19/45* (2013.01); *G01S 19/48* (2013.01);
(Continued)

(58) Field of Classification Search
CPC .......... G01S 19/47; G01S 19/45; G01S 19/48; G01S 19/49; G01S 5/0205; G01S 5/0263;
(Continued)

(56) References Cited

U.S. PATENT DOCUMENTS 8,187,182 B2 * 5/2012 Kahn .................. A61B 5/1038
600/300
8,284,100 B2 * 10/2012 Vartanian ............... G01S 15/08
342/357.3
(Continued)

*Primary Examiner* — Chuong P Nguyen
(74) *Attorney, Agent, or Firm* — Bay Area Technology Law Group PC

(57) ABSTRACT

The invention relates to navigation, particularly, to detection of indoor and outdoor positions of mobile devices. Technical result of the invention is to improve the accuracy of mobile terminal position detection at time of occurrence of a specific trigger event and decrease of load on sensor, computing, communication and other resources of the mobile terminal at times when a trigger event occurs. Mobile terminal positioning technique at the trigger event moment, is characterized by the following sequence: receipt of series of readings of inertial and non-inertial sensors, identification of intervals, during which readings of at least one sensor generates a stationary process; then detection of at least one point of time, when at least one stationary process is replaced by another stationary process; then identification of parameters of at least one pattern of movement for at least one stationarity interval; then detection of at least one position of the mobile terminal according to readings of non-inertial sensors; estimation of mobile terminal path according to parameters of at least one pattern of movement and then of position corresponding to change of one stationary process to another; then detection of mobile terminal position at time corresponding to a specific trigger event.

16 Claims, 3 Drawing Sheets

(51) Int. Cl.
*H04W 4/02* (2018.01)
*H04W 4/029* (2018.01)
*H04W 8/22* (2009.01)
*H04M 1/725* (2006.01)

(52) U.S. Cl.
CPC ............ H04W 4/027 (2013.01); H04W 4/40 (2018.02); *G01S 5/0205* (2013.01); *G01S 5/0294* (2013.01); *H04M 1/72572* (2013.01); *H04W 4/029* (2018.02); *H04W 8/22* (2013.01)

(58) Field of Classification Search
CPC ..... G01S 5/0294; H04W 4/027; H04W 4/046; H04W 8/22; H04M 1/72572
USPC .............. 342/357.3, 357.28, 357.31, 357.32
See application file for complete search history.

(56) References Cited

U.S. PATENT DOCUMENTS

| | | | | |
|---|---|---|---|---|
| 8,784,309 B2* | 7/2014 | Kahn | ............... | A61B 5/1038 600/300 |
| 8,842,496 B2* | 9/2014 | Vartanian | ............... | G01S 15/08 367/128 |
| 9,144,398 B1* | 9/2015 | Kahn | ............... | A61B 5/1038 |
| 9,163,946 B2* | 10/2015 | Chowdhary | ............ | G01C 21/20 |
| 9,304,208 B2* | 4/2016 | Lim | ............... | G01S 19/34 |
| 9,743,253 B2* | 8/2017 | Heikkila | ............... | H04W 4/026 |
| 9,784,582 B2* | 10/2017 | Georgy | ............... | G01S 19/47 |
| 10,145,707 B2* | 12/2018 | Chowdhary | ......... | A61B 5/0022 |
| 10,492,042 B2* | 11/2019 | Clemente | ............... | G08G 1/147 |
| 2009/0098880 A1* | 4/2009 | Lindquist | ............... | G01S 19/34 455/456.1 |
| 2013/0245986 A1* | 9/2013 | Grokop | ............. | H04M 1/72569 702/141 |
| 2013/0314278 A1* | 11/2013 | Lim | ............... | G01S 19/34 342/357.74 |
| 2014/0368382 A1* | 12/2014 | Vartanian | ............... | G01S 15/08 342/357.55 |
| 2015/0304817 A1* | 10/2015 | Yorifuji | ............... | H04M 1/67 455/456.1 |
| 2019/0045330 A1* | 2/2019 | Wang | ............... | H04W 4/029 |
| 2019/0243371 A1* | 8/2019 | Nister | ............... | B60W 30/09 |
| 2019/0286948 A1* | 9/2019 | Sathyanarayana | ..... | G06Q 10/00 |
| 2019/0302767 A1* | 10/2019 | Sapp | ............... | G06N 20/00 |

* cited by examiner

METHOD FOR POSITIONING A MOBILE TERMINAL AT THE MOMENT WHEN A TRIGGER EVENT OCCURS

CROSS REFERENCE TO RELATED APPLICATIONS

This application claims priority from and benefit of PCT Patent Application Serial No. PCT/RU2014/000918, filed Dec. 8, 2014, which is entitled "TECHNIQUE OF POSITIONING A MOBILE TERMINAL AT THE MOMENT WHEN A TRIGGER EVENT OCCURS."

FIELD OF THE PRESENT INVENTION DISCLOSURE

The invention relates to navigation, particularly, to detection of indoor and outdoor positions of mobile devices.

BACKGROUND

An ideal positioning system would work anytime, anywhere, as accurately as possible. However, often in practice it is possible to know position at each moment of time. Identification of device position, especially when users are ordinary people, may be related to services, substance of which is to inform users about certain events and, therefore, only at specific time, and, perhaps, in a specific location. Examples of such services can be: automatic recorders of parking fact with indication of exact location to stop the vehicle, or services such as "check-in", announcing about visitor coming in the boutique. Insignificant episodes at first glance related to user movement, such as getting out of the vehicle, entering the house, going upstairs, movement on escalator or in elevator can be related to events of user interest. These events depending on service must be identified either in real time or during post-processing. Tools for second type of service may be route trackers and software refreshing the user's route.

To identify these positions, concept of a trigger event is used, which is defined as an event that initiates the subsequent action process. Example of trigger event can be entrance of the visitor to a shop or a restaurant that would result in start of sending of information to user, such as LBS or LBA messages, discount coupons or service alike. This invention provides a technique for detection of the position of the mobile terminal at time of trigger event occurrence.

Background solution U.S. Pat. No. 6,640,188, Car Navigation Apparatus Capable of Determining Entry into Parking Area, Pioneer Corporation, was published on Oct. 28, 2003. This solution describes a device that detects entry to the parking area by tracking the following events: detection of passage of turns, detection of staying out of crossroads (passing places). If both indicators are activated, it is assumed that the vehicle is maneuvering in the parking area. In order to generate a signal for each of these events, the device comprises a GPS receiver and system such as Dead Reckoning (calculation of coordinates). The advantage of this technique is limited set of sensors and ability to work in parking areas without additional infrastructure.

The disadvantage is the need for constant operation of all navigation systems, such as GPS and inertial navigation system (INS). When using additional sources of navigation data (additional information increases the degree of "hybridization" of navigation device that can improve quality of positioning), load on measuring and computing terminal devices increases proportionally to the number of sensors and addition of computations to supporting software. Another disadvantage of the technique implemented in this device is analysis of only one type of movement—vehicular traffic. This disadvantage implicates another one—its unsuitability for detection of other types of events important for the user.

There is technical solution described in US20110029277, Methods and Applications for Motion Mode Detection for Personal Navigation Systems, Mahesh Chowdhary, Arun Kumar, Manish Sharma, Kolin Paul, Mahaveer Jain, Gagan Narula, published on Feb. 3, 2011. This solution describes a technique for determining the type of movement of mobile terminal, comprising the following steps: collection of data from inertial sensors, comparison of data collected with the sets of training data for various patterns of movement, identification of current type of movement based on this comparison.

Also, there is technical solution described in US20120303271, Hierarchical Context Detection Method to Determine Location of a Mobile Device on a Person's Body, Sirf Technology Holdings, Inc, published on Nov. 29, 2012. This solution describes a technique for detection of the position of a mobile terminal, comprising: classifying the mode of mobile terminal movement by data acquired from navigation sensors and then positioning of mobile terminal using detected movement mode as one of the parameters of time and/or frequency analysis of data obtained from sensors. Combination of these two methods can improve positioning accuracy through the use of more appropriate (with respect to the previously discussed technique) filtering parameters of navigation data. Accordingly, this technique allows for analyzing inertial sensor data and other data acquired during movement of the mobile terminal inside and outside the vehicle. The disadvantage of this technique, as in the previous case, is the increased load on computing, sensor, communication and other components of mobile terminal. Furthermore, the need for precise identification of terminal movement mode as one of conditions of the technique may reduce its effectiveness in cases, where movement mode does not exactly match the set of predefined modes of movement, or when parameters of mobile terminal movement model cannot be uniquely identified before implementation of basic positioning procedure, using these parameters as filter settings.

SUMMARY

The invention is aimed at avoiding the disadvantages of existing solutions.

Technical result of the invention is to improve the accuracy of mobile terminal position identification at time of occurrence of particular trigger event and decrease of load on sensor, computing, communication and other resources of mobile terminal at times when a trigger event occurs.

Mobile terminal positioning method at trigger event moment is characterized by the following procedure: receive readings of inertial and non-inertial sensors, thus, allocate time intervals during which a sequence of readings of at least one sensor forms a stationary process; further define at least one time moment when minimum one stationary process is replaced by another stationary process; then, at least for one interval of stationarity, define parameters of at least one movement pattern; and then define minimum one position of mobile terminal based on readings from non-inertial sensors; provide assessment of path of mobile terminal according to parameters of at least one movement model, then of position corresponding to the time of change of one stationary process to another stationary process; then it may be identified with position of mobile terminal at time corresponding to particular trigger event.

In one embodiment, the path of mobile terminal is estimated, and a set of potential parameters is defined for at least two movement patterns.

Stationary time intervals may be contiguous.

In one embodiment, one interval of stationarity corresponds to the model of vehicle movement, and the other stationarity interval corresponds to the model of pedestrian movement.

Identified position of mobile terminal can be stored in memory of the mobile terminal.

In one embodiment, after position identification a message is sent to mobile terminal with information related to the location of mobile terminal.

In one embodiment, after position identification a message is sent to mobile terminal with information related to trigger event occurred.

In one embodiment, one stationarity interval corresponds to the model of pedestrian's movement without change of the vertical component of its position, and the other stationarity interval corresponds to the model of pedestrian movement with the change of vertical component of its position.

In one embodiment, one interval of stationarity corresponds to pattern of pedestrian movement on horizontal part of the room, and the other stationarity interval corresponds to the model of pedestrian movement on the stairs, escalator or in elevator.

In one embodiment, one of stationarity intervals corresponds to mobile terminal operation in a static mode.

In one embodiment, one of stationarity intervals corresponds to mobile terminal operation in the vehicle.

In one embodiment, the trigger event is a movement of mobile terminal from the vehicle outside.

In one embodiment, one interval of stationarity corresponds to position of the user in open air, and the other stationarity interval corresponds to the user staying indoors.

In one embodiment, for at least one stationarity interval the composition of non-inertial sensors used for position determination can be determined.

In one embodiment, a gyroscope and/or accelerometer are used as an inertial sensor.

In one embodiment, a magnetic field sensor (magnetometer) and/or a compass, and/or pressure sensor (barometer), and/or image sensor (camera), and/or microphone, and/or touch screen, and/or Wi-Fi and/or BLE and/or NFC and/or 3G/LTE and/or GPS/GNSS can be used as non-inertial sensor.

DETAILED DESCRIPTION

Figure 1:
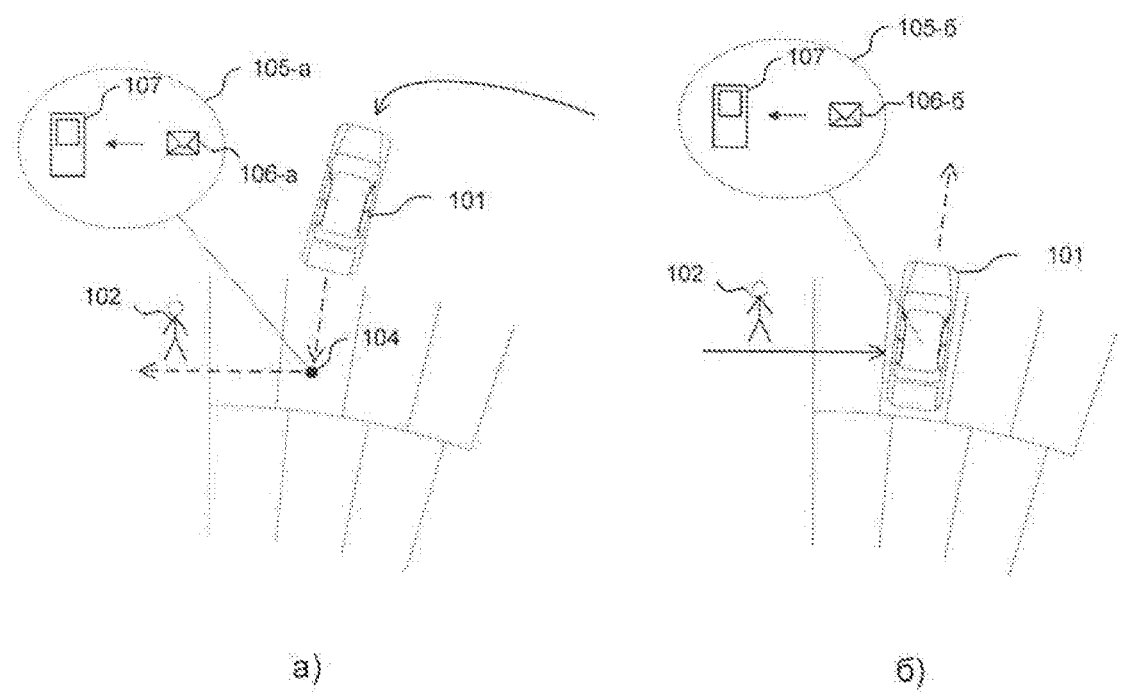
FIG. 1 shows two trigger events associated with vehicle parking and entrance or exit from it by a user with mobile terminal. In Figure a) vehicle 101 arrives to a place in the parking area. After parking user 102 with mobile terminal 107 gets out of the vehicle. At this point, the mobile terminal is in position 104. Getting out of the vehicle by the mobile terminal user corresponds to the trigger event 105-a. When an event 105-a is detected, message 106-a is sent to mobile terminal 107. Figure b) shows how the user 102 enters the vehicle 101 and moves away. The moment of entering is identified as trigger event 105-b, at which mobile terminal 107 receives a message 106-b.

Essence of the technique consists of the following sequence of steps: series of readings of inertial and non-inertial sensors may be saved in the mobile terminal; intervals, during which readings of at least one sensor forms a stationary process, may be identified; at least one point of time, when at least one stationary process is replaced by another stationary process, may be defined; parameters of at least one model of movement may be defined for at least one stationarity interval; according to saved readings of selected non-inertial sensors, series of positions of mobile terminal may be detected, and then estimation of mobile terminal path according to parameters of minimum one movement pattern may be provided resulting in estimation of position path corresponding to the transition time from one stationary process to another; then it may be identified with position of mobile terminal at time corresponding to particular trigger event.

In one embodiment, at least one sensor with stationary readings in selected time intervals, is an inertial sensor.

In one embodiment, a set of potential parameters is identified for at least two movement patterns. In other implementation options, stationarity time intervals are contiguous.

In one embodiment, one stationarity interval corresponds to the model of vehicle movement, and the other stationarity interval corresponds to the model of pedestrian movement. In other implementation options—one stationarity interval corresponds to the pattern of pedestrian movement without change of the vertical component of its position, and the other stationarity interval corresponds to the model of pedestrian movement with the change of vertical component of its position. In last mentioned case, in one embodiment, one stationarity interval corresponds to the model of pedestrian movement on horizontal section of the room, and the other stationarity interval corresponds to the model of pedestrian movement on the stairs or the escalator, or in elevator. In one embodiment, one stationarity interval corresponds to position of the user outdoors, and the other stationarity interval corresponds to the user staying indoors.

In one embodiment, one of stationarity intervals corresponds to mobile terminal state in a static mode. In some other embodiments, one of stationarity intervals corresponds to mobile terminal position inside the vehicle.

A feature of some more implementation options is that triggering event registered by the mobile terminal is a movement of the mobile terminal from the vehicle outside.

In one embodiment, identified position of the mobile terminal is stored in its memory. Thus, in one embodiment, after identification of position, a message with information about the identified location of the mobile terminal and/or a message on the trigger event occurred is sent to the mobile terminal. Also, in one embodiment, information associated with location of the mobile terminal may be sent to the mobile terminal.

In one embodiment, for at least one stationarity interval, composition of non-inertial sensors used for position identification may be determined.

The technique is based on the fact that a lot of events the user is interested in, when the user leaves or enters a specific place, involves a disturbance of the former stationarity flow of sensor navigation data and the emergence of a new steady-state data from the sensors. Furthermore, events appealed are called trigger events. Examples of stationary processes observed in sensory navigation data are: recurrent changes in acceleration at walking, sound of engine at constant speed (at constant engine speeds), missing or constant acceleration while driving a vehicle (intervals with a constant or zero acceleration when driving a vehicle are dominating), constant presence of a signal from a particular transmitter, permanent characteristics of received radio signal, and so on.

Examples of trigger events may be: getting out of the vehicle, entering the store, restaurant or other facility indoor, change of floor, going inside the room from the outside, out of the room. Some less significant events, such as starting/stopping of movement may be essential. Information about these events is not transmitted to the user of the mobile terminal. As for these events, the mobile terminal can change from sleep mode, or half-asleep mode to active support of position, or vice versa—to stop continuous positioning with maximum accuracy, transiting into sleep mode.

In many cases, detection of position of the mobile terminal at time of origin of trigger event can be of greater benefit, because the knowledge of the position allows us to offer terminal user services associated with its location (LBS/LBA—Location Based Service/Advertising) or to assist at the place of occurrence of the event.

In addition to the sleep mode, which allows for significant reduction of power consumption, as well as to suspend the exchange of data with the server, the mobile terminal can be with identification of optimal parameters of collaborative filtering of navigation data using Kalman filter or Particle Filter. There is no Russian equivalent of the term yet, so hereinafter it is referred to as PF. As known, effectiveness of state vector evaluation with Kalman filter becomes better when mathematical model of system in which computations are performed is described better. A similar relationship holds for the use of PF. Thus, PF in case of clustering of cloud, particles allows simultaneous use of multiple sets of parameters corresponding to different movement patterns. It is also possible to update the parameters in filtering process. Thus, at the entrance of the main positioning algorithm using Kalman filter or PF, there may be only roughly estimated parameters of movement pattern. Movement pattern parameters can be specified in filtering process, if they behave stationary. However, we know that the model of the movement of the mobile terminal is unsteady. Due to this, in one embodiment, change of mobile terminal movement pattern is detected using identified time intervals, for which specific sensor readings are stationary.

In order to detect time intervals during which reading of one or more sensors are stationary, time or frequency analysis techniques may be used. For example, Fourier transform of individual portions of inertial sensors data is computed, Fourier transforms for different portions of data compared, and if the amplitude characteristics of computed results are steady, analyzed process would be accepted as stationary process. There are other potential implementation options.

Rational use of computing power of the mobile terminal allows (virtually without increasing energy consumption) for additional computations at time intervals adjacent to the moment of occurrence of the trigger event. In particular, movement model parameters may be updated and re-applied in Particle Filter. Re-estimation and re-use can be repeated several times. As a result, position of the mobile terminal at time of occurrence of trigger event will be updated, as well as positions corresponding to specific time intervals before and after. Based on this principle, in one embodiment, full generation of path of movement of the mobile terminal (often referred to as a track) is available. The resulting track is a "cross-linking" of piecewise tracks covering specific trigger events, and stationarity intervals bordering with them.

EXAMPLES

Illustrative techniques of mobile terminal positioning at time of occurrence of trigger event can be implemented as described below.

Hereinafter, the mobile terminal refers to any device that can move with the user and which is capable of supplying the user with information, including information about its position. An example of the mobile terminal can be devices such as smartphones, tablet computers, mobile phones, notebooks, netbooks, pedestrian and motor vehicle navigation devices, trackers and similar devices. It also includes devices worn on the user's body, among which we can mention "smart glasses" (for example, Google Glass), "smart watches" (for example, Apple Watch), devices for sports and fitness, portable medical devices to control parameters of organism and others.

Trigger event is considered to be an event that initiates the subsequent action process. As an example of trigger event a situation when a driver gets out of the vehicle in the parking area that may result in the initiation of process of identification and reporting the driver on parking area space number. Another example—a visitor entering the store or a restaurant that may result in start of transfer of information to user, such as LBS and LBA messages. Another example may be the event of the start of movement, or, conversely, its stop. The consequence of these events may be initiation of transition process of the mobile terminal from the sleep mode to the active support of the position, or vice versa—termination of continuous positioning and changing to sleep mode.

Another example of the trigger event may be an abrupt change in parameters of state of elderly person. Such an event may initiate the process of emergency aid. The list of trigger events examples may be continued.

In many cases, for successful implementation of actions initiated by the trigger event, one may know mobile terminal position at time of occurrence of this event. This detection of position may be required both when the mobile terminal is outdoor, where signals of satellite navigation systems such as GPS and GLONASS can be used, and when mobile terminal is indoor. Indoor positioning refers to positioning in all facilities, both artificial and natural, aboveground and underground, where positioning by signals of navigation satellites is impracticable due to significant attenuation in the walls, floorings and ceilings of the building.

FIG. 1 shows two options of trigger events as an example. FIG. 1 a) gives an example of an event when a vehicle 101 arrives and stops in the parking area at position 104, and then the user 102 gets out of the vehicle. Trigger event 105-a is user 102 getting out of the vehicle 101. If parking place 104 is known, it will allow the user to quickly find a parked vehicle in the future, when the user has finished his business and wanted to find his vehicle. To do this, automatically detected location of the vehicle (or more precisely, mobile terminal inside the vehicle at the time) is transmitted to mobile terminal 107 in the form of message 106-a. FIG. 1 b) gives an example of a trigger event when the user 102 returns to the vehicle left in parking area 101, enters it and leaves. At time of departure of a vehicle, mobile terminal 107 identifies the event 105-b, resulting in sending a message to mobile terminal 106-b. Upon event 105-b, the mobile terminal can automatically switch over the map, hiding the floor plan, where user 102 could be prior to access to parking area, and start displaying the position of the mobile terminal on a small-scale map with the plan of the city.

It is assumed that the mobile terminal includes inertial sensors, which measure the movement characteristics of the terminal, as well as non-inertial sensors that measure physical characteristics of the environment. For example, a list of sensors of mobile terminal may include inertial sensors (such as gyroscopes and accelerometers), sensor of magnetic field (magnetometer), compass, pressure sensor (barometer), image sensor (camera), microphone, touch screen, telecommunication and navigation modules such as modules WiFi, BLE, NFC, 3G/LTE, GPS/GNSS and others. In future, introduction of new sensors in mobile terminals is possible.

The mobile terminal may be equipped with at least a part of aforementioned sensors including inertial ones (e.g., an accelerometer and gyroscope) and non-inertial (e.g., WiFi module receiver, magnetometer, etc.). This assumption is not restrictive, since, for example, smartphones and tablet PCs, in general, have a complete set of these sensors.

To solve this problem sensors are scanned in a mobile terminal and series of inertial and non-inertial sensors reading are saved.

The sequence of observations at the output of mobile terminal sensor randomly selected, in general is a random function of time, i.e. random process. At the same time, values of diverse nature can be considered as observations. An example of a random process at the output of the sensor can be a sequence of acceleration values measured by the accelerometer, angular rate, as measured by a gyroscope, barometric pressure measured by a barometer, etc. Another example is the sequence of values of signal power measured by WiFi or Bluetooth module receiver. Also, a sequence of information symbols, such as iBeacon UUID, user coordinates from smartphone output GNSS receiver and other values can be considered as an example.

Further, the concept of a stationary random process in a broad sense is used, the moments of the first and second order that does not depend on time, and the correlation function depending only on time difference. Further, speaking about the statistical characteristics of stationary random process, we will bear in mind points of the first and second order, correlation function and its associated spectral density, and other functions of a random process.

All real processes in one way or another are different from steady-state, which is a consequence of the fact that the physical systems that produce these processes change their characteristics over time. To account for this fact hereinafter the concept of a piecewise stationary random process is used. Piecewise stationary random process is characterized by that fact that its characteristics on finite intervals coincide with characteristics of a stationary random process. At the same time, these characteristics can vary from interval to interval. A special case of a piecewise stationary random process is a process of finite duration, as well as processes that have beginning or end.

Example of piecewise stationary random process x(t) for two time intervals separated by time T, can be written as follows:

$$x(t) = \begin{cases} y_1(t), t < T \\ y_2(t), t \geq T \end{cases} \quad (1)$$

where $y_1(t)$ and $y_2(t)$—stationary random processes with different statistical characteristics, and T is shift moment. Further, shifting event occurring at time T, is regarded as the aforementioned trigger event. In particular case, where one of the processes $y_1(t)$ and $y_2(t)$ is identically equal to zero, event of activation or deactivation of sequence of observations at sensor output occurs respectively.

Figure 2:
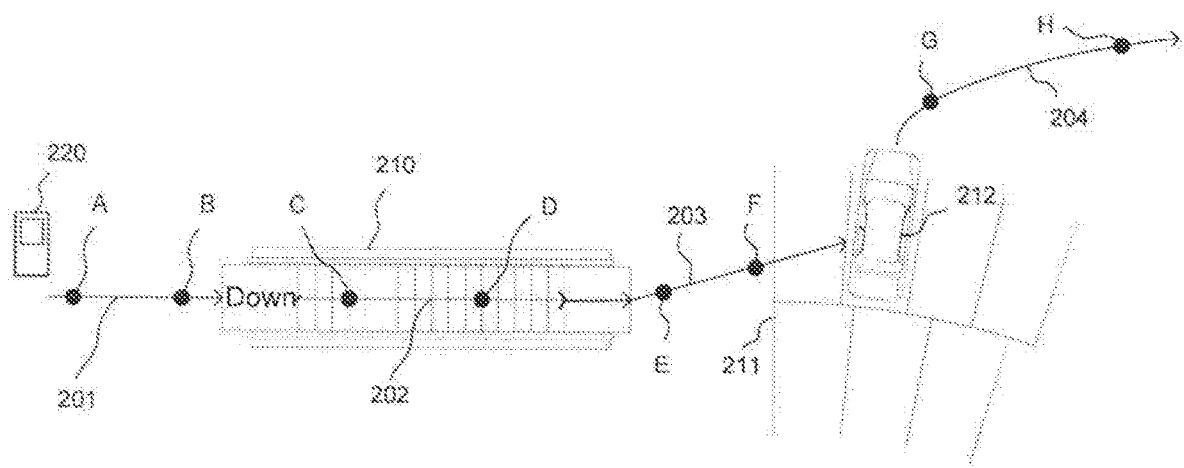
FIG. 2 shows a section of the route of the mobile terminal, comprising way down stairs and out of the parking area by a vehicle. Mobile terminal 220 is moved along the path consisting of four sections: section 201—horizontal section of pedestrian type of movement, section 202—movement on the stairs 210, section 203—second horizontal section from stairs 210 to the parked vehicle 212, section 204—start of movement inside the vehicle 212. Section of movement 201 comprises a plurality of positions, including positions A and B, and section 202 includes a number of positions, in particular C and D. Section 203, in particular, contains positions E and F. Section 204 contains positions G and H.

We continue describing proposed technique of positioning. FIG. 2 shows in detail returning of mobile terminal user to the parked vehicle. The user of mobile terminal 220 passes through the first horizontal section 201, then down the stairs 210, which corresponds to the inclined section 202, and then passes through a second horizontal section 203, sits in the vehicle 212 and drives off along path 204. Sections of the path 201, 202, 203 and 204, where 202 corresponds to passage on stairs 210, together form a complete path of the mobile terminal movement to the parked vehicle and then from the parking area being in the vehicle. Each section of the path can be represented by a set of intermediate positions. For clarity, two positions of each section way are discussed: positions A and B for the section 201, C and D for the section 202, E and F for the section 203, G and H for the section 204.

At any time in the mobile terminal sensors are allocated, information from which allows viewing presence of the mobile terminal in this state, where random process formed by sensors observation, is stationary at a specific time interval. Time intervals, during which a sequence of readings of at least one sensor forms stationary process, are identified. At least one time interval when minimum one stationary process is replaced by another stationary process is detected. Possible implementation of these operations is described in the following example.

Figure 3:
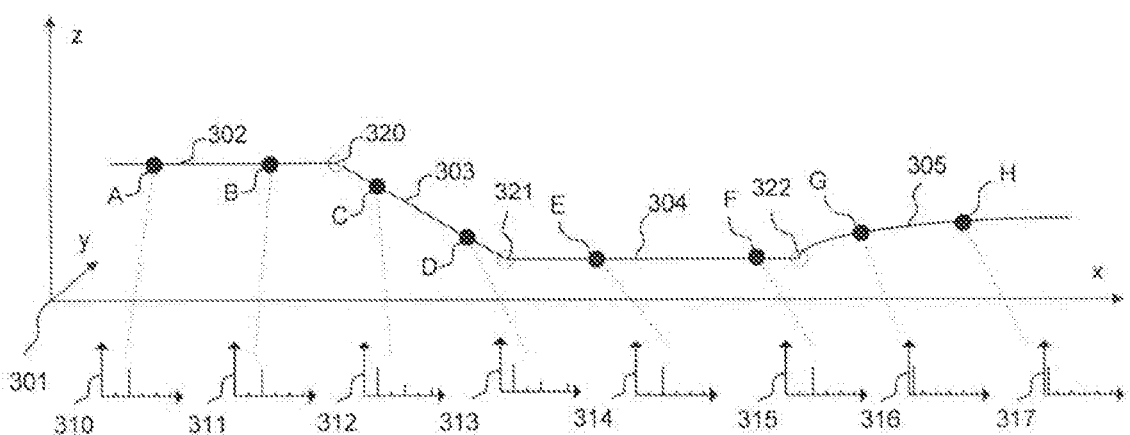
FIG. 3 shows the path of mobile terminal in the form of combined sections with fixed parameters measured within the respective intervals. The path is presented in three-dimensional coordinate system 301. Stationary section 302 includes positions A and B, which correspond to the characteristics 310 and 311, and stationary section 303 includes positions C and D, which correspond to characteristics 312 and 313; stationary section 304 includes positions E and F, which correspond to characteristics 314 and 315; stationary section 305 contains position G and H, which correspond to characteristics 316 and 317.

FIG. 3 shows an example of the path of indoor movement of the mobile terminal on horizontal section 302, stairs section 303, second horizontal section 304, and then inside the vehicle while leaving the parking area along path 305. During movement along the path formed by these sections, the mobile terminal, running in native (main) mode, undertakes periodic estimations of process parameters and identifies stationarity intervals.

Exclusively for example, method of detecting stationarity intervals through the Fourier transform for short intervals (Short-Time Fourier Transform, STFT) is considered. STFT is defined as follows:

$$F(f,s) = \sum_{n=0}^{N-1} x(n) w(n-S) e^{-j2\pi f n \Delta t} \qquad (2)$$

where x (n)—data flow,
w (n)—window function (analysis window),
66 t—sampling interval,
S—shift of the window,
N—number of samples in analysis window,
F(fS)—STFT at frequency f and shift S.

Data flow is multiplied by window function of finite duration, and then the Fourier transform is performed. Then, window function is shifted in time by S samples, and the Fourier transform is carried out again. The offset value may be different. For example, displacement may be by one count. Then the analysis window will move smoothly ("sliding" window). In another implementation options, the analysis window may be shifted to several readings, for example by half of the width of the window, i.e. to N/2. This is the case of so-called "skipping" window. In both cases time series STFT from data flow will be received. Comparing adjacent STFT, i.e. STFT at the nearby location of window function, it is possible to give an opinion on steady-state data flow, if the adjacent images differ only slightly, and the change of one stationary process with another, if adjacent images significantly differs. Differences between adjacent STFT may be identified in different ways. For example, it is possible to calculate the ratio of modules of two adjacent STFT at different frequencies and to compare the maximum ratio with a threshold. Exceeding the threshold will signal about the difference between adjacent STFT.

An example of constant characteristics observed in a flow of sensory data is frequency of accelerations recorded by the accelerometer of the mobile terminal during walking. For the case shown in FIG. 3 accelerometer data can be considered as a data flow.

In areas of regular walking 302, 303 and 304 STFT will contain a pronounced component at the frequency of steps. In normal driving on horizontal section, frequency of steps is close to 1.8 Hz. When driving on the stairs frequency of steps is reduced, and the frequency of component is shifted to lower frequencies.

At vehicle 305 movement start, STFT will no longer contain high-amplitude components centered at the frequency of steps. STFT will be of wideband nature, containing no discrete components.

Thus, adjacent STFT within each section 302, 303, 304 and 305 will not have significant differences, making it possible to conclude that the observed process at each of these sections is stationary. Characteristics 310 in an unknown position A are similar to those of 311 in an unknown position B. Similarly, characteristics 312 in an unknown position C are similar to those of 313 in an unknown position D. Characteristics 314 in an unknown position E are similar to those of 315 in an unknown position F, and characteristics 316 in an unknown position G are similar to those of 317 in an unknown position H.

According to difference of STFT in points 320, 321 and 322 at the junction of sections 302-305, a conclusion may be made about the change of a stationary process. In positions 320, 321, 322 stationarity of the process is broken: characteristics 311 are not equivalent to those of 312, characteristics 313 are not equivalent to those of 314, characteristics 315 are not equivalent to those of 316. Change of some locally constant characteristics by other locally constant characteristics means that one stationary process begins instead of another stationary process. Time corresponding to unknown positions 320, 321 and 322 are the boundaries of stationarity intervals. Position 322 may correspond to a trigger event—when mobile terminal user enters the vehicle and drives from the parking area.

Figure 4:
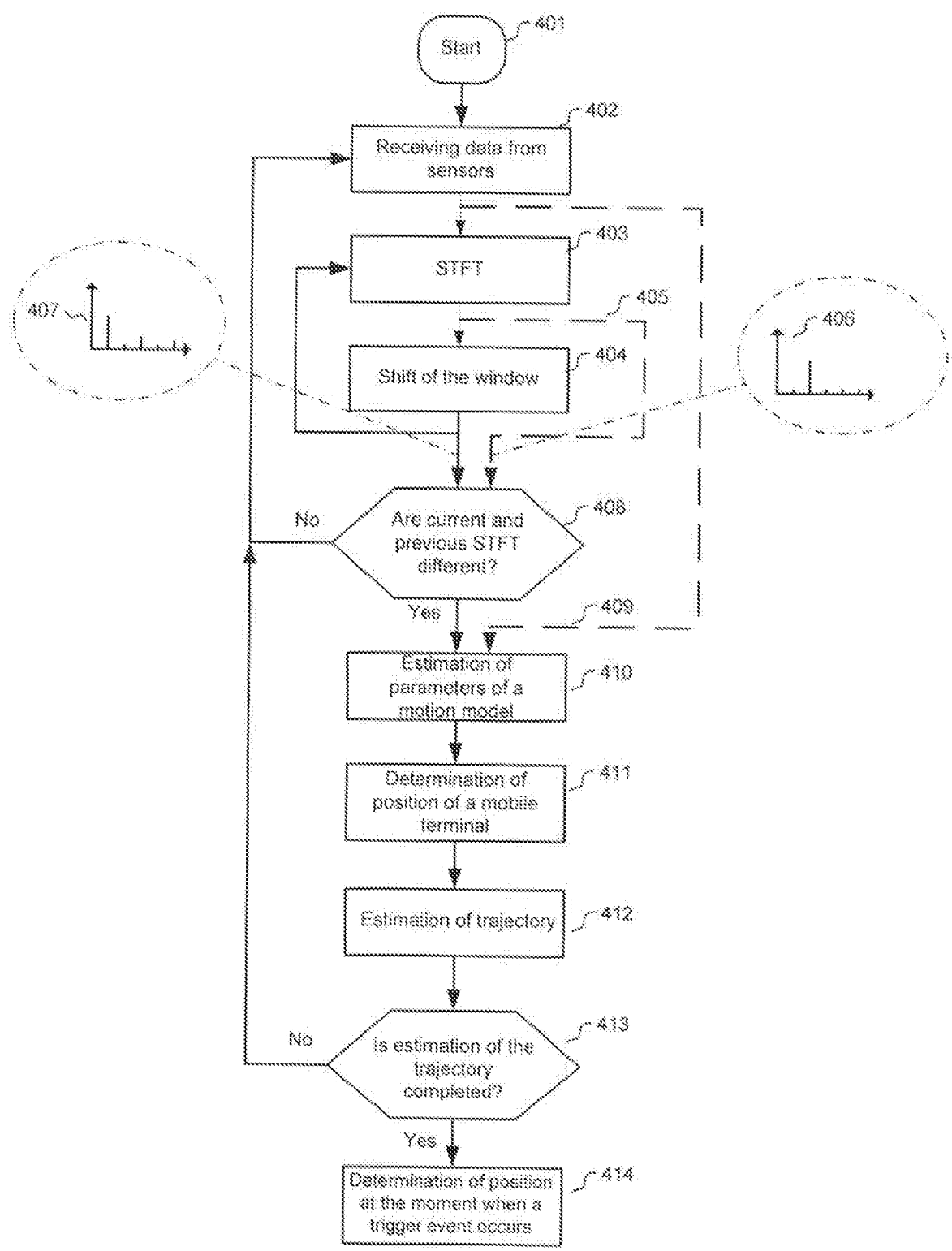
FIG. 4 depicts an example of possible algorithm for detection of mobile terminal position at time of occurrence of trigger event. Algorithm is a closed cycle that includes a number of additional operations on a specific condition. After start 401, sensors are scanned, and data (402) received. Within the duration of window function, STFT (Short-Time Fourier Transform) 403 is performed. Then, shift of the window 404 is performed, and STFT is repeated. The dotted line 405 shows the transmission of current data of STFT. Current data of STFT 406 and previous data 407 are compared in the comparator 408. The dotted line 409 shows the path of sensor data transmission to parameters estimation module 410. Module 411 estimates mobile terminal position. Module 412 estimates mobile terminal path. Unit 413 checks completion of path estimation. Module 414 detects mobile terminal position at time of trigger event.

FIG. 4 shows possible algorithm of mobile terminal operation with identification of stationarity intervals through STFT. The algorithm is shown for example to explain a possible implementation. After start 401, sensors are scanned, and data (402) received. Within duration of window function STFT 403 is performed. Then, a shift of the window 404 is performed, and STFT is repeated. The dotted line 405 shows the transmission of current data STFT. Current data of STFT 406 and previous data 407 are estimates of the range of acceleration in the coordinates of frequency (horizontal axis)—the amplitude range (vertical axis). Current data STFT 406 and previous data 407 are compared in the comparator 408. If current (406) and previous (407) STFT data differs (as in this example), then proceed to the subsequent operations that will be described below. If current (406) and previous (407) STFT data are not different, there is a return to data acquired from the sensor (402) and continuing through the stationary detection intervals by STFT.

In another example, the mobile terminal can be in constant connection with the radio in vehicle. Radio communication can use standard Bluetooth, ZigBee, IEEE 802.15.4, or otherwise. The sequence of measurements of radio signal strength generated by a radio mobile terminal generates a random process, which can be considered as stationary until such time when the owner of the terminal will not leave the interior of the vehicle. Obviously, when exiting the vehicle, in the cabin of which there is a constant signal of a certain radio transmitter, there will be disappearance of a stationary process—the process associated with the power of transmitter signal, and possible transmission of a specific set of data by radio transmitter, and new stationary process related to frequency of user steps will start.

Another example of piecewise stationary process is a sequence of differences of adjacent pressure measurements performed by the barometer. While the owner of the mobile terminal with barometer, moves horizontally, this process has zero mean value. When the user of the mobile terminal enters the elevator and begins to move vertically, average value of the specified process becomes non-zero value, and the value depends on speed of elevator. New value of average value is stored until the elevator stops, and then it again equals to zero.

In this example, there are three stationarity intervals of the process: before entering the elevator, during vertical movement of the elevator and after elevator movement. At each of the intervals, observed process of barometer difference measurement is stationary in the sense described above, and differs by average value, i.e. moment of the first order. Moments of shifting between different values of the average value correspond to the trigger event of start and end of movement of the elevator. These events can trigger the process of informing the user on shops and restaurants, located on different floors of the shopping center, show desired floor plan on the screen of smartphone, etc. Stationarity interval identification in this example and definition of shifting times is reduced to the analysis of average value, and may be implemented by comparing estimation of movement average value and threshold.

In other cases, for allocation of intervals of stationarity known algorithms may be used, for example, Brodsky B. E., Darkhovsky B. S. Non-Parametric Statistical Diagnosis, Springer, 2000 or Basseville M., Nikiforov I., Detection of Abrupt Changes: Theory and Application, Prentice Hall 1993.

It should be noted that analysis of data flow from sensors of the mobile terminal can be performed in separate computing modules of the mobile terminal. For example, analysis of steps, and thus, stationarity features identification on data of inertial sensors can be performed in a separate processor. Thus, the mobile terminal may be a smartphone, and special processor dedicated for primary processing of inertial data may be, for example, ARM Cortex M3 or another popular processor of this class.

According to the techniques of this disclosure, sensors data processing can be made exclusively in the specialized coprocessors without involving CPU of the mobile terminal in computation process. CPU in this case may be in a power saving mode. This mode of operation of the mobile terminal in a number of implementation options of the proposed technique is the main mode of operation. FIG. 4 shows operations 402-408 as for the main mode. The mobile terminal remains in this mode most of time. In other implementation options processing of sensor data may be performed in CPU. Thus, central processor of the mobile terminal will not perform complete identification of the position in continuous mode that allows for operation of the central processor in lower power mode. Further, this mode is also referred to as the main mode of the mobile terminal operation.

In one embodiment, in addition to a low-power CPU, some sensors can be switched off, if the mobile terminal is in the main mode, or data processing from these sensors may be terminated.

Sensor data processing in the main mode of the mobile terminal operation includes identifying characteristics of individual data flows or multiple flows together, allowing for identification of stationarity of observable random processes. At the same time, presence of stationary process at a specific time interval, and its termination is defined. If stationarity of the process is not disturbed, deactivation of the main operation mode of the mobile terminal does not occur.

Upon detection of process stationarity termination in one embodiment, the mobile terminal is transferred from the main mode to positioning mode. FIG. 4 shows operations 410-414 as for the positioning mode. In other implementation options, transfer of the mobile terminal to the positioning mode is possible only at termination of previous and detection of new stationary process. In third implementation option, transfer of the mobile terminal in the positioning mode is performed when a new steady-state process differs by a set of its characteristics from previous stationary process by sufficient amount.

Analysis of stationary sections can be made simultaneously for several processes. For example, sequence of pressure measurements performed by a barometer may be analyzed, as well as sequence of acceleration measurements performed by an accelerometer.

Upon detection of a stationary process in some implementations, its classification may be made. For example, communication between data acquired from the transmitter and position of the mobile terminal inside the vehicle or between data properties from inertial sensors and user movement pattern can be detected. In other implementation options, such an analysis, when the mobile terminal is in the main mode, it is not performed. In other implementation options, such analysis is performed neither in any main mode of mobile terminal operation, nor during operation of the mobile terminal in the positioning mode. In one embodiment, decision to switch to positioning mode is assumed in a case, if characteristics of previous and new stationary processes with a specific probability show the origin of a specific trigger event at moment of change of characteristics of stationary processes.

In further phase of mobile terminal operation in the positioning mode, parameters of at least one model of movement, corresponding to minimum one stationarity interval identified during the operation of the mobile terminal in the main mode (module 410, FIG. 4), are defined. At the same time, data obtained from sensors are used that can be explained by dotted line 409 in FIG. 4. In one embodiment, a set of potential parameters are detected based on classification of a stationary process. For example, if the result of classification identifies pedestrian movement, model parameters may include the step length range and user's stature. In other implementation options, initial velocity and acceleration of the user can be assumed, however, type of movement is seen not only as a pedestrian, consisting of regular right steps, but as combined, allowing for a variety of ways of user's movement and its handling with the mobile terminal. In one embodiment, stationarity interval corresponding to space-hold of the mobile terminal may be identified. In particular, it can be made to calibrate the acceleration sensors (method ZUPT). In one embodiment, stationarity intervals corresponding to the movement on the stairs, escalator, in elevator are identified. Unambiguous classification of these intervals can not be done. Assignment of stationarity interval to a specific type of user's movement can be probabilistic in nature.

Exclusively as an example, possible implementation of definition of parameters of movement model, corresponding to steady-state intervals, can be considered. For the case shown in FIG. 3, movement pattern in its simplest form can be written as follows:

$$x_t = x_{t-1} + l_t \cos(\theta_t), \quad (3)$$

$$y_t = y_{t-1} + l_t \cos(\theta_t), \quad (4)$$

where t—time that can be considered as integral without loss of generality, $x_t$ and $y_t$—coordinates of the mobile terminal computed in Cartesian coordinate system, $\theta_t$—direction (direction of movement) in the same coordinate system, $l_t$—distance that the mobile terminal moves between the time t−1 and t.

In FIG. 3, parameter of movement model $l_t$ has different values for different stationarity intervals shown in this figure. Within walking areas 302, 303 and 304 $l_t$—is a pedestrian step length. Thus, the area of inclined movement on stairs 303 has different $l_t$ than the length of the step within horizontal sections 302 and 304. In the area of vehicular traffic, parameter 305 $l_t$ numerically equals to the speed of vehicle at time between t−1 and t.

Detection of the step length $l_t$ within walking areas can be implemented based on data from accelerometers. In a first approximation, the step length is a linear function of steps frequency. Direction of movement $\theta_t$ may be detected based on data from a magnetic compass and gyroscope. Appropriate algorithms are known from literature, for example, Section 10 of the book—Principles of GNSS, Inertial, and Multisensor Integrated Navigation Systems, by P. D. Groves, Artech House, 2008.

The vehicle speed, which is desirable for detection of the parameter within vehicular traffic area 305, may be received by the mobile terminal, for example via a vehicle interface OBD-II. OBD-II Standard is supported in vehicles built after 1996. There are adapters that allow for connection of the mobile terminal, such as a smartphone, with OBD-II interface via Bluetooth wireless network.

Next, it's desirable to detect the quantity of mobile terminal positions independent from each other at different time periods. Module 411 corresponds to this operation (FIG. 4). Detection of mobile terminal positions is based on information acquired from non-inertial sensors. In one embodiment, composition and parameters of non-inertial sensors for stationarity intervals identified during operation of the mobile terminal in the main mode may be detected. For example, for an interval corresponding to the case when the mobile terminal is outdoor, information of GNSS signals receiver may be used for detection of the position, and for an interval corresponding to detection of the position, if the mobile terminal is located in a parking area or other building, radio signals of WiFi access points or Bluetooth are used.

The next step is to estimate the path of the mobile terminal (module 412 in FIG. 4). In one embodiment, path estimation is provided by the Kalman filter. In other implementation options, path estimation may also be obtained by using Particle Filter (PF). Theory of PF is described in the literature, for example, F. Gustafsson, Particle Filter Theory and Practice with Positioning Applications, IEEE A&E SYSTEMS MAGAZINE Vol. 25, No. 7, July 2010, part 2, p. 53-81. Advantage of PF compared with conventional Kalman filter is its applicability to non-Gaussian noise and nonlinear measurement models.

Thus, in one embodiment, the filter parameters may be specified in filtering process. Clarifying parameters can be carried out once or repeatedly (iteratively). In one embodiment, for data filtering at intersection of two intervals of stationarity, specific parameters can be applied to ensure smooth transition from one movement pattern to another. In some other implementation options, transition from one model to another movement pattern is uneven. In all cases, filtration of navigation data of the mobile terminal includes time of recording of completion of former stationary process. In one embodiment, several options of movement model characteristics are used in process of filtering and interfacing of data in PF. Alternative characteristics of movement pattern are applied to specific groups of particles, determined either randomly or on basis of clustering of cloud (particles). In one embodiment, movement model parameters are specified by instruction or adjustment of these parameters out of PF. In other implementation options, movement model parameters clarification is not performed.

Filtering of data from inertial and non-inertial sensors is made at time interval, which covers at least part of the previous stationary process and minimum a part of following time interval associated with the start of a new stationary process. In one embodiment, sensor data are processed from more than two intervals of stationarity in the positioning mode. In process of filtering and linking of navigation data in PF, in Kalman filter or other filter of this type, complete route of the mobile terminal at a predetermined time interval is computed. In one embodiment, the computed route can be considered iteratively, while time coverage may be gradually increased as long as the route will not be entered by position with good accuracy of absolute reference to the plan. Presence of position in calculated route qualified as a position defined with high absolute accuracy, as well as number of positions, computed with high relative accuracy, provides a fairly accurate position in the required trigger point. If the position with high precision of absolute linking corresponds to a later time than required trigger time point, accurate position of the mobile terminal at trigger time can be provided, for example, by "backtracking".

Now potential path estimations based on PF will be described. Summary of PF algorithm is as follows. It's randomly generated by M objects called particles (there is no exact Russian term, the word "particles" or "samples" may be used). Each particle can be regarded as coordinates of the object, i.e. in this example as a pair of Cartesian coordinates $(x_t^i, y_t^i)$. For each particle weight $w_t^i$, is specified depending on the value of probability density for a given position. If a pattern of movement is known, a new set of particles is generated on basis of inertial sensors by moving them into new positions. Thus, the stage of prediction is implemented in PF. Then, the measurement is carried out (for example, induction of WiFi radio field, magnetic field strength, map), and based on it, correction (update) of particles weights is provided.

For the above example, prediction step is to apply to every particle of movement model of the object (3) and (4), resulting in a new set of particles:

$$x_t^i = x_{t-1}^i + l_t^i \cos(\theta_{t h u\ i}), \tag{5}$$

$$y_t^i = y_{t-1}^i + l_t^i \cos(\theta_{t h u\ i}), \tag{6}$$

where i—number of particle, i=1, . . . , M, $$l_t^i \propto N(l_t, \sigma_{lt}^2)$$

$$\theta_t^i \propto N(\theta_t, \sigma_{\theta t}^2) \tag{7}$$

$N(m, \sigma^2)$—probability density function as per Gaussian law with mean m and dispersion $\sigma^2$.

lt—track length, $\theta_t$—direction (movement direction defined with PDR) $\sigma_{lt}^2$, $\sigma_\theta^2$, —dispersion of track length and direction.

New weight values are computed at the correction stage:

$$w_t^i = w_{t-1}^i \cdot (z_t | x_t^i, y_t^i), i=1, \ldots M, \tag{8}$$

where $p(z_t | x_t^i, y_t^i)$—likelihood function obtained on the basis of zt measurements, which may be WiFi signal strength, magnetic field strength and other output values of non-inertial sensors.

Then normalization of weights is performed:

$$w_t^i = \frac{w_t^i}{\sum_{i=1}^{M} w_t^i}, i = 1, \ldots, M \tag{9}$$

Current estimation of the position is generated, for example, as weighted mean for all particles:

$$\hat{x}_t = \sum_{i=1}^{M} x_t^i w_t^i, \ \hat{y}_t = \sum_{i=1}^{M} y_t^i w_t^i, \quad (10)$$

Another feature of PF is resampling procedure—known from the literature, for example, from above publication, and therefore is not discussed here.

In this example, mobile terminal path is estimated on the basis of measurements of non-inertial sensors. For this, correction of weights in accordance with formula (10) is performed, wherein the likelihood function $p(z_t|x_t^i, y_t^i)$ may be as follows:

$$p(z_t | x_t^i, y_t^i) = \frac{1}{2\pi\sigma_m^2} e^{-\frac{(x_t^i - f_x(z_t))^2 + (y_t^i - f_y(z_t))^2}{2\sigma_m^2}} \quad (11)$$

where $f_x(z_t)$, $f_y(z_t)$—functions calling back mobile terminal coordinate estimation based on measurement $z_t$, obtained at stage 411 (FIG. 4), $\sigma_m^2$—variance of said evaluation.

Functions $f_x(z_t)$, $f_y(z_t)$ depend on what particular measurements are used for positioning and on estimation of the technique used. In the example of FIG. 3, intervals 302 and 303 correspond to the user's indoor location. To detect the position in points A, B, C and D, shown in FIG. 2 and FIG. 3, one of positioning techniques can be used indoors, for example, by measuring RSSI signal level at WiFi access points. For example, WiFi fingerprinting can be used. In case of intervals 304 and 305, mobile terminal position computation depends on where there is a parking area. If the parking area is located under the ground, intervals 304 and 305, also correspond to the user's indoor location, and position in points E, F, G and H can be detected in the same manner as at points A, B, C and D. If the parking area is under the open sky, the position in points E, F, G and H can be detected with GNSS signals. Thus, path estimation is provided based on all measurements and based on movement pattern, specific for each interval of stationarity. After completion of path estimation (block 413 in FIG. 4), detection of the position at the time of trigger event is to be carried out (module 414).

The position at stationarity interval shift is identified with the position of mobile terminal at time corresponding to a particular trigger event. In this example, position 322 may correspond to a trigger event—when mobile terminal user enters the vehicle and moves out of the parking area. For a more accurate detection of the position in point 322 interpolation may be used using movement pattern equations (3) and (4).

At final step, in one embodiment, information about a trigger event and computed location of the mobile terminal is stored in the memory of the mobile terminal. In one embodiment, a message with the information about the event and about the position of the mobile terminal at the time of its occurrence is sent to the mobile terminal. In other implementation options, a message associated with the position of the mobile terminal when an event occurs is sent to it, for example, Geo Targeting advertising message.

The above mentioned implementation option of the present invention is described for illustrative purposes only. Within the scope of invention various modifications may be provided.

What is claimed is:

1. A method for positioning a mobile terminal positioning at a trigger event moment, comprising:
   providing at least one processor;
   acquiring with the at least one processor inertial and non-inertial sensors readings for the mobile terminal and allocating time intervals during which a sequence of readings of at least one sensor generates a stationary process;
   detecting with the at least one processor at least one time interval when at least one stationary process is replaced by another stationary process, wherein each stationary process represents a random process with different statistical characteristics describing movement of the mobile terminal;
   detecting with the at least one processor parameters of minimum one movement pattern for at least one stationarity interval;
   detecting with the at least one processor at least one position of the mobile terminal based on readings of non-inertial sensors;
   estimating with the at least one processor a mobile terminal path according to parameters of at least one pattern of movement; and
   detecting with the at least one processor a position corresponding to a transition time from one stationary process to another with the position of the mobile terminal at a time corresponding to a particular trigger event.

2. The method of claim 1 including detecting many potential options for at least two movement patterns.

3. The method of claim 2, wherein stationarity time intervals are contiguous.

4. The method of claim 3, wherein one stationarity interval corresponds to a pattern of vehicle movement and another stationarity interval corresponds to a pattern of pedestrian movement.

5. The method of claim 4, wherein a computed position of the mobile terminal is stored in the memory of the mobile terminal.

6. The method of claim 5, wherein after position detection a message is sent to the mobile terminal with information related to a location of the mobile terminal.

7. The method of claim 6, wherein after position detection a message is sent to the mobile terminal with information related to an occurred trigger event.

8. The method of claim 3, wherein one stationarity interval corresponds to a pattern of pedestrian movement without change of a vertical component of position, and another stationarity interval corresponds to a pattern of pedestrian movement with a change of vertical component of position.

9. The method of claim 8, wherein one stationarity interval corresponds to the pattern of pedestrian movement within horizontal room section, and the other stationarity interval corresponds to the pattern of pedestrian movement on the stairs or the escalator, or in elevator.

10. The method of claim 3, wherein at least one stationarity interval corresponds to a mobile terminal position in static mode.

11. The method of claim 3, wherein at least one stationarity interval corresponds to a mobile terminal position in a vehicle.

12. The method of claim 11, wherein the trigger event is a movement of the mobile terminal from outside the vehicle.

13. The method of claim 3, wherein one stationarity interval corresponds to an outdoor position of the user and another stationarity interval corresponds to an indoor position of the user.

14. The method of claim 1, wherein for at least one stationarity interval, a defined set of non-inertial sensors used for position detection is used.

15. The method of claim 1, wherein the inertial sensor comprises at least one of a gyroscope and an accelerometer.

16. The method of claim 1, wherein the non-inertial sensor comprises at least one of a magnetic field sensor, a compass, a pressure sensor, an image sensor, a microphone, a touch screen, Wi-Fi, BLE, NFC, 3G/LTE, and GPS/GNSS.

* * * * *